Aug. 30, 1949.　　　　　E. R. SWANSON　　　　2,480,789
REINFORCED CORRUGATED PANEL
Filed Aug. 24, 1944　　　　　　　　　　4 Sheets-Sheet 1
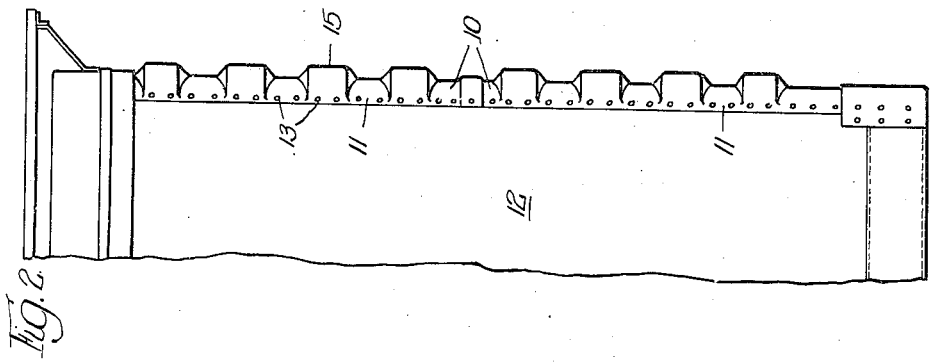
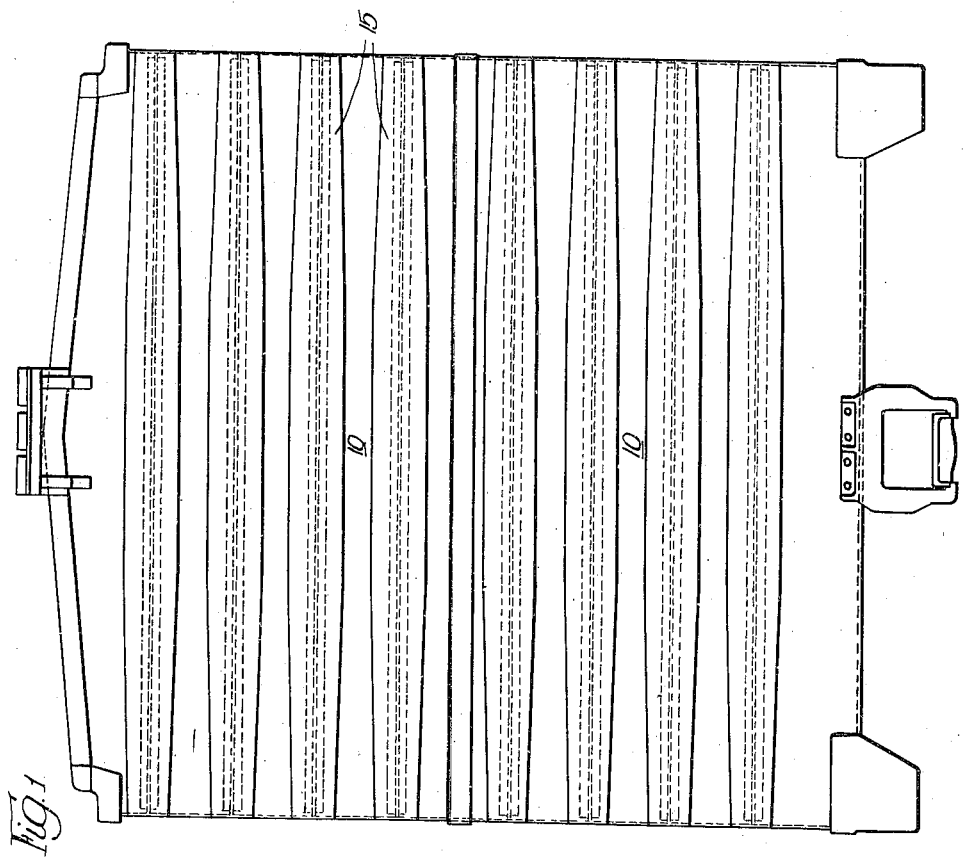
INVENTOR.
Earl R. Swanson,
BY Aug. 30, 1949.　　　　E. R. SWANSON　　　　2,480,789
REINFORCED CORRUGATED PANEL
Filed Aug. 24, 1944　　　　　　　　　　　4 Sheets-Sheet 2
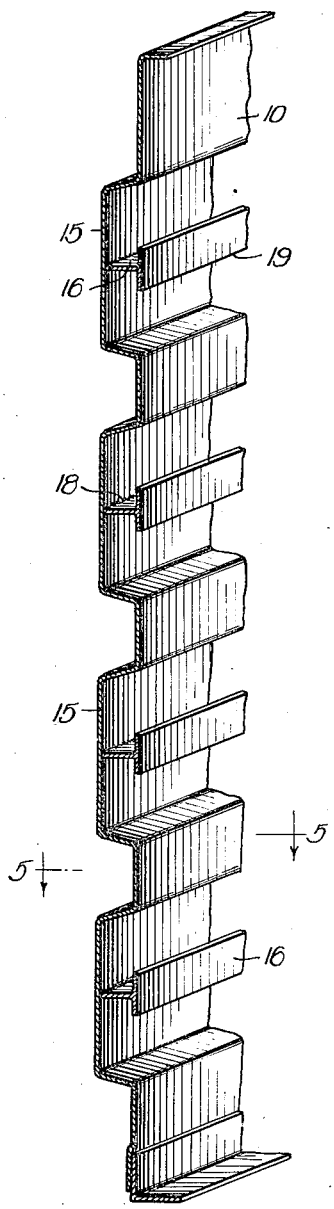
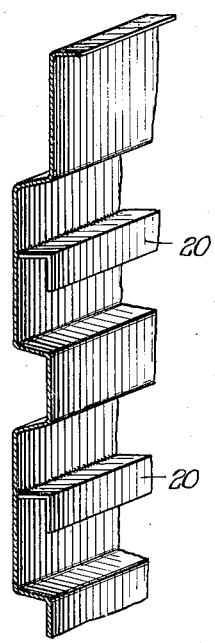
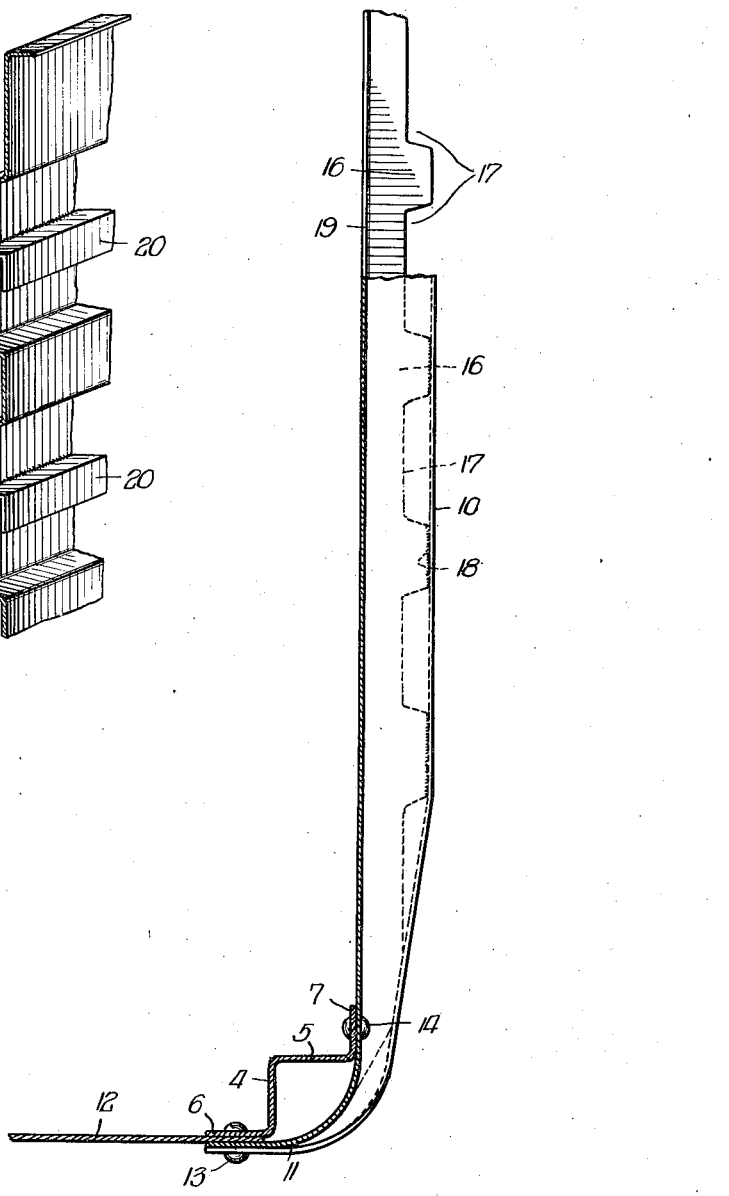
INVENTOR.
Earl R. Swanson,
BY

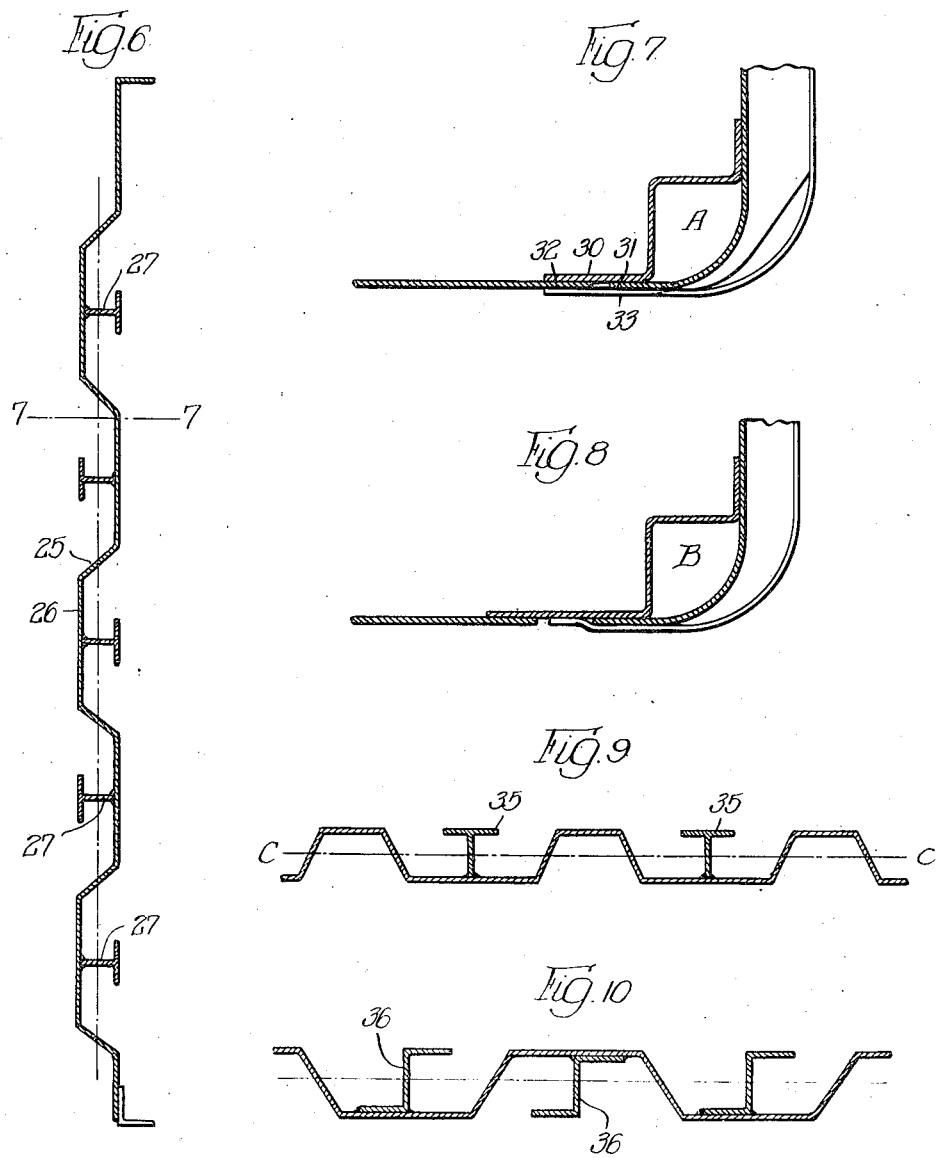

Aug. 30, 1949.  E. R. SWANSON  2,480,789
REINFORCED CORRUGATED PANEL
Filed Aug. 24, 1944  4 Sheets-Sheet 4
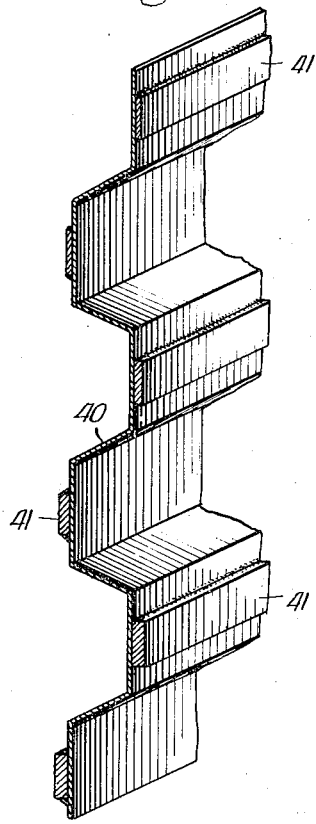
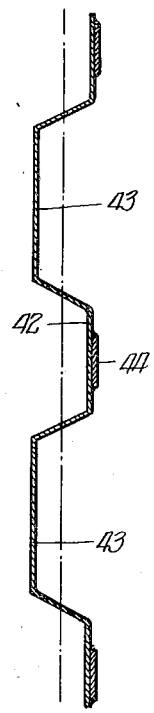
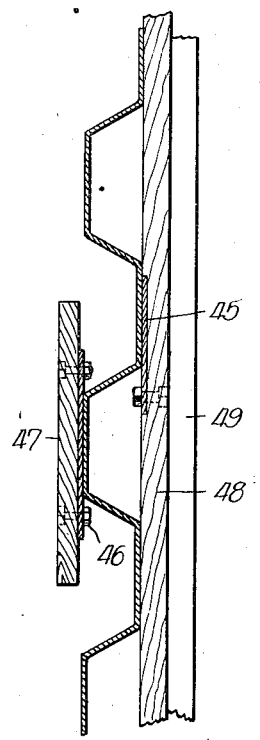
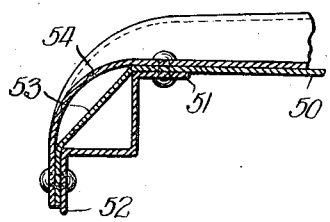
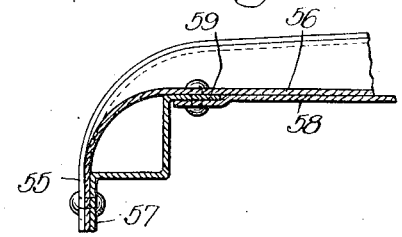
INVENTOR.
Earl R. Swanson,
BY Patented Aug. 30, 1949

2,480,789

UNITED STATES PATENT OFFICE 2,480,789

REINFORCED CORRUGATED PANEL

Earl R. Swanson, Chicago, Ill., assignor to Standard Railway Equipment Manufacturing Company, Chicago, Ill., a corporation of Delaware Application August 24, 1944, Serial No. 550,926

6 Claims. (Cl. 105—409)

1

The invention relates to railway car structures, and more particularly to end walls; drop end gates; side doors; hopper doors; roofs and other panels or structures comprising metallic plates or sheets formed with a plurality of substantially parallel corrugations.

An object of the invention is to reinforce such a corrugated plate or panel by means positioned, preferably within the corrugations, so as not to increase the space between the bounding planes of the corrugated panel or structure.

In a corrugated panel made of relatively thin metallic sheets, a further object of the invention is to strengthen the compression side of the corrugated structure which, when the parallel corrugations are made of equal widths and depths, is weaker than the tension side of the corrugated plate when subjected to beam action.

A further object is to provide a corrugated metallic sheet of substantially the same thickness throughout and to provide reinforcements where greater strength is needed. For instance, in the end wall of a railway car, greater strength is needed adjacent the floor of the car, and in a car roof, greater strength is needed midway between the end walls of the car.

A further object of the invention is to provide a relatively shallow stiffening means adjacent the apices of the corrugations which provide greater strength in the portions of the corrugated plates under extreme fibre stress, preferably in both tension and compression sides of the corrugated plate, without materially reducing the resiliency of the corrugated structure.

In many corrugated structures the corrugated panel extends between and is secured to opposite frame members of the car. In an end wall the corrugated structure extends between spaced corner posts, which are frame members of the car. Likewise, the roof extends between the side wall side plates (or top chords) which are frame members of the car. Likewise, the stiles of a door.

A further object of the invention is to extend the reinforcement for the corrugated panel between the frame members of the car structure and secure them to the frame members, preferably so that the corrugated structure and the reinforcement will cooperate to increase the strength of the corrugated structure to resist loads imposed upon it.

A further object is to dispose the metal of the corrugated plate and the reinforcement so that the compression and tension sides of the combined structure will be substantially equal, thereby obtaining substantially maximum strength per pound of material used.

Other objects and advantages of the invention will appear in the following description thereof.

Referring now to the accompanying drawing forming part of this application and wherein like reference characters indicate like parts.

Fig. 1 is an end elevation of a railway car embodying my invention.

Fig. 2 is a side elevation of a portion of the car shown in Fig. 1.

Fig. 3 is a vertical section through the end wall sheet shown in Fig. 1 in partial perspective.

Fig. 4 is a section similar to Fig. 3 showing the reinforcing member in the form of an angle bar.

Fig. 5 is a section on the line 5—5 of Fig. 3, partially broken away to show the reinforcing member and corner construction.

Fig. 6 is a vertical section through a corrugated panel showing a modified form of the invention.

Fig. 7 is a section on the line 7—7 of Fig. 6 through the corner post of a car showing an alternate manner of attaching side sheathing thereto.

Fig. 8 is a section similar to Fig. 7.

Fig. 9 is a view similar to Fig. 6, but of a modified form of the invention.

Fig. 10 is likewise a view similar to Fig. 6 of a still further modified form of the invention.

Fig. 11 is a vertical section through a portion of a corrugated plate showing a still further modification of reinforcing means therefor.

Fig. 12 is a modification of the structure shown in Fig. 11.

Fig. 13 is a further modification and application of the invention shown in Fig. 11.

Fig. 14 is a horizontal section through a corner post of the car showing a possible attachment of the end wall and reinforcing strip of Fig. 12 thereto.

Fig. 15 is a section similar to Fig. 14 of a modified attachment of the end wall and reinforcing strip of Fig. 11 thereto.

Referring now to Figs. 1 to 5. One of the corner post members of the car is shown most clearly in Fig. 5 and comprises the angularly disposed arms 4 and 5, along the outer edge of each of which is formed a flange 6, on the arm 4, and 7 on the arm 5. These flanges extend at substantially right angles to their respective arms and thus there is formed a substantially "W-section" corner post.

The end wall is formed of a metallic plate 10 having flanges 11 on opposite vertical margins thereof, which flanges are formed on curves of substantial radius and each of which terminates in a flat vertical edge portion which bears flatwise to the flange 6 of the corner post. The car sheathing indicated at 12 extends between the flanges 6 and 11 and all are rigidly secured together, as by a vertical row of rivets 13, or other suitable means. The plate 10 is provided with a plurality of spaced horizontally extending corrugations 15 which corrugations are deeper and wider at their central portion and decrease in width and depth progressively toward either vertical edge and extend around the flanged margin 11 of the plate and merge into the flat edge portion thereof. Thus the corrugations extend from side to side of the plate and when the plate is secured to corner posts of a car, as illustrated, act as beams and carry any load imposed thereupon to said corner posts. It will be noted that the end wall sheet crosses and bears against the flange 7 of the corner post and is secured thereto, as by a vertical row of rivets 14, or any other suitable manner, and thereby cooperate with the corner post to form a box structural element.

Corrugated steel ends for box cars are usually made of quite thin plate, the corrugations strengthening the plate so that it is adaptable for railway car use, and yet the inherent resilience of the material is not destroyed, particularly when the corrugations are so designed that the section modulus and bending moment curves of the plate follow each other as closely as practicable. When the corrugations are as wide as those illustrated herein, it is apparent that a substantial force directed at either side thereof would cause it to fail, and, therefore, I have shown T shaped reinforcing bars 16, with the stems thereof welded on a line approximating the longitudinal center of the corrugations 15. Since it is not essential that the stem be welded continuously to the base of the corrugations and to save weight, I have shown the edges of said stems cut away, as at 17, at spaced intervals and welded therebetween, as at 18, to the corrugations.

It will be noted that the flange 19 of the reinforcing bar is disposed in the same plane as the original plane of the sheet. Adjacent the ends of the bar the stem is cut away to the flange so that said flange crosses the flange 7 of the corner post and may be bent around the corner and overlap the vertical margin of the side sheathing 12, between it and the flange 11 of the end wall. The flange 19 of each reinforcing bar is secured to the flange 7 alternately to the means for securing the base of the corrugations thereto, and to this extent provides additional means for the secure attaching of the end wall to the corner posts. Of course, the outer margins of the flanges are secured to the flange 6 by the same means that secures the side sheathing and end wall thereto.

The modification shown in Fig. 4 illustrates an angle bar 20 used as the reinforcing or stiffening member for the plate; otherwise the structure is the same as that heretofore described.

The modification shown in Fig. 6 illustrates a plate 25 wherein the ridges and valleys of the corrugations 26 are equal; in other words, the same amount of material is disposed on opposite sides of the neutral axis of the plate, thereby equalizing its strength in either compression or tension. The reinforcements 27, therefore, are placed on opposite sides of the plate, extending outwardly from the valleys of the corrugations so that the plate is stiffened, without destroying its balance.

Fig. 7 is a horizontal section through a corner of a car on the line 7—7 of Fig. 6 and shows one flange 30 of the corner post elongated somewhat so that the ends of the flanges 31 of the T-stiffener and the marginal edge 32 of the side sheathing may terminate in the same vertical plane and flatwise against the flange 30 and be secured thereto in any practicable manner. The flange 33 of the end plate then overlaps both the margin 32 and end 31 of the stiffener and is secured to both. Thus the thickness of the side sheathing is saved in the overall width of the car.

Fig. 8 illustrates another method of accomplishing the same result as in Fig. 7, but wherein the end wall may be removed if desired without disturbing the fastening means for securing the side sheathing to the flange of the corner post, said flange being extended somewhat for this purpose.

Fig. 9 is a modification of the structure shown in Fig. 3, but wherein the stiffening bar 35 is proportioned so that its material compensates for the unequal size of the corrugations and thereby disposes the same amount of material on opposite sides of the neutral axis of the plate.

In Fig. 10 the ridges and valleys of the corrugations in the plate are equal, and the stiffening member 36 shown is that of a Z-bar which projects from the valleys of the corrugations on opposite sides of the sheet, similarly equalizing the material on opposite sides of the neutral axis.

Fig. 11 shows a means of reinforcing a corrugated metallic plate wherein the corrugations are of the same width and depth and the thickness of the reinforcing strips may be varied according to the strength requirements of the plate. The corrugated plate is shown at 40 and the reinforcing strips or plates at 41, which may or may not extend the full length of the corrugations depending upon the section modulus requirement. Since greater strength is needed toward the bottom of the plate, when used as a wall for retaining a load, the thickness of the reinforcing plates 41 may be progressively increased from top to bottom of the corrugated plate thereby progressively adding strength thereto. These reinforcing plates 41 are preferably on the outside of the corrugated plate so as to obtain greater increase in strength from same, being farther from the neutral axis, but they may be placed on the inside of the corrugated plate if clearance necessitates. This same result may be obtained by using reinforcing strips of the same thickness of material but of progressively increasing width.

In Fig. 12 the corrugations are unequal in width, those (42) pressed on one side of the plate being narrower than those (43) pressed on the other side thereof. A reinforcing strip 44 is, therefore, secured to the narrower corrugations and is of an area so that the material on opposite sides of the neutral axis is equal, thereby equalizing the strength of the panel.

Fig. 13 shows an adaptation of the invention wherein it is used as a means to secure a placard board to the corrugated wall of a car. In this view the reinforcing strip 45 is wider than the corrugation to which it is attached so that the sides of said strip 45 provide a means through which holding bolts 46 may extend to thereby hold such a board 47 to the wall. Similarly on the inside of the wall, a reinforcing strip wider than the corrugation, may hold a nailing strip 48 to which the car lining 49 may be attached.

In Fig. 14 I have shown the ends of the reinforcing strips 50, such as shown in Fig. 12, as materially reinforcing the corner post of the car, in that said strips extend from one flange 51 to the other flange 52 diagonally, as at 53, thereby forming in effect a triangular corner post which is much stronger than a rectangular one, as, for a triangular post to fail one of its sides must collapse. Furthermore, the flange 54 of the corrugated plate extending around the corner and being secured to said arms 51 and 52 forms an arch which also reinforces said corner post structure.

Fig. 15 shows a manner of attaching the reinforcing strips shown in Fig. 11, those 55 on the outside of the car end 56 curving around the arch flange of said end and being secured therewith to the flange 57 of the corner post, whereas the reinforcing strips 58 on the inside of the car end are secured therewith to the flange 59 of the corner post.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. Reinforcing means for a wall for a railway car having spaced frame members each comprising angularly disposed arms, a wall sheet having marginal flanges each formed on a radius and secured to both arms of one of said frame members, respectively, to form an arch therebetween, said sheet formed with a plurality of substantially parallel corrugations which extend around the corners of the car and merge into said flanges, said reinforcing means comprising a member disposed longitudinally within one of said corrugations and extendable between said frame members and adapted to be secured to both arms of both frame members.

2. Reinforcing means for a wall for a railway car having spaced frame members each comprising angularly disposed arms, a wall sheet having marginal flanges secured to both arms of one of said member members, respectively, to form a box structure, said sheet formed with a plurality of substantially parallel corrugations which extend around the corners of the car and merge into said flanges, said reinforcing means comprising a separate T-shaped member disposed longitudinally within one of said corrugations extendable between said frame members and the flange of said member adapted to be secured to both arms of both frame members and extend diagonally therebetween and the stem of the T-shaped member secured to the corrugation.

3. Reinforcing means for a wall for a railway car having spaced frame members each comprising angularly disposed arms, a wall sheet having marginal flanges each formed on a radius and secured to both arms of one of said frame members, respectively, to form an arch therebetween, said sheet formed with a plurality of substantially parallel corrugations which extend around the corners of the car and merge into said flanges, said reinforcing means comprising a separate T-shaped member disposed longitudinally within one of said corrugations extendable between said frame members and the flanges of said member adapted to be secured to both arms of both frame members and extend diagonally therebetween and the stem of the T-shaped member secured to the corrugation.

4. Reinforcing means for a wall for a railway car having spaced frame members each comprising angularly disposed arms, a wall sheet having marginal flanges, each secured to both arms of one of said frame members, respectively, to form a box structure, said sheet formed with a plurality of substantially parallel corrugations which extend around the corners of the car and merge into said flanges, said reinforcing means comprising a separate member disposed longitudinally within one of said corrugations and extendable between said frame members and adapted to be secured to both arms of both frame members.

5. Reinforcing means for a wall for a railway car having spaced frame members each comprising angularly disposed arms, a wall sheet having marginal flanges each formed on a radius and secured to both arms of one of said frame members, respectively, to form an arch therebetween, said sheet formed with a plurality of substantially parallel corrugations which extend around the corners of the car and merge into said flanges, said reinforcing means comprising a separate member disposed longitudinally within one of said corrugations and extendable between said frame members and adapted to be secured to both arms of both frame members and extend diagonally therebetween.

6. A wall for a railway car, said wall comprising a metallic plate formed with a plurality of substantially parallel corrugations which project alternately in opposite directions from the neutral axis plane of the plate, said corrugations merging into said plate adjacent opposite edges thereof, and separate reinforcements each having a stem disposed longitudinally within and at substantially right angles to some of said corrugations, the stem of each of said reinforcements being cut away at spaced intervals for welding therebetween to said corrugations.

EARL R. SWANSON.

REFERENCES CITED

The following references are of record in the file of this patent:

UNITED STATES PATENTS

| Number | Name | Date |
|---|---|---|
| 1,465,501 | Van Dorn | Aug. 21, 1923 |
| 1,813,537 | Gilpin | July 7, 1931 |
| 1,868,134 | Bonsall | July 19, 1932 |
| 2,074,433 | Schlesinger | Mar. 23, 1937 |
| 2,074,439 | Tangerman | Mar. 23, 1937 |
| 2,185,168 | Gumper et al. | Dec. 26, 1939 |
| 2,255,900 | Schlesinger | Sept. 16, 1941 |
| 2,311,501 | Zoldok | Feb. 16, 1943 |
| 2,323,446 | Boswinkle | July 6, 1943 |